(12) United States Patent
Pacaci

(10) Patent No.: US 9,458,870 B2
(45) Date of Patent: Oct. 4, 2016

(54) SUPPORTING FRAMEWORK NODE

(71) Applicant: Devrim Pacaci, Istanbul (TR)

(72) Inventor: Devrim Pacaci, Istanbul (TR)

( * ) Notice: Subject to any disclaimer, the term of this patent is extended or adjusted under 35 U.S.C. 154(b) by 113 days.

(21) Appl. No.: 14/383,110

(22) PCT Filed: Feb. 27, 2013

(86) PCT No.: PCT/IB2013/051571
§ 371 (c)(1),
(2) Date: Sep. 5, 2014

(87) PCT Pub. No.: WO2013/132392
PCT Pub. Date: Sep. 12, 2013

(65) Prior Publication Data
US 2015/0021285 A1    Jan. 22, 2015

(30) Foreign Application Priority Data
Mar. 6, 2012   (TR) ................. u 2012 02527

(51) Int. Cl.

| | |
|---|---|
| *F16B 7/00* | (2006.01) |
| *E04B 1/24* | (2006.01) |
| *E04B 2/88* | (2006.01) |
| *F16B 9/02* | (2006.01) |
| *E04B 1/19* | (2006.01) |
| *E06B 3/54* | (2006.01) |

(52) U.S. Cl.
CPC . *F16B 7/00* (2013.01); *E04B 1/24* (2013.01); *E04B 2/885* (2013.01); *F16B 9/02* (2013.01); *E04B 1/1912* (2013.01); *E04B 2001/1927* (2013.01); *E04B 2001/2406* (2013.01); *E04B 2001/2481* (2013.01); *E04B 2001/2496* (2013.01); *E06B 3/5445* (2013.01)

(58) Field of Classification Search
CPC .............. F16B 7/00; F16B 9/02; E04B 1/24; E04B 2/885; E04B 1/1912; E04B 2001/1927; E04B 2001/2406; E04B 2001/2481; E04B 2001/2496; E06B 3/5445
USPC ........................................................ 211/182
See application file for complete search history.

(56) References Cited

U.S. PATENT DOCUMENTS 2,001,215 A * 5/1935 Ruppel ..................... E04B 1/24
  403/157
3,002,590 A * 10/1961 Hannoosh ............. E04B 1/3211
  343/872

(Continued)

FOREIGN PATENT DOCUMENTS

DE         9114149 U1    1/1992

*Primary Examiner* — Korie H Chan
(74) *Attorney, Agent, or Firm* — Gokalp Bayramoglu

(57) ABSTRACT

A supporting framework, comprising a plurality of nodes and one framework component, the framework component, selected from a group, consisting of one diagonal brace, one panel and combinations thereof, one of the nodes, comprising one connector and one bar, each of the connectors comprising a plurality of mating bores, and each of the bars, comprising a first end and a second end, wherein one of the nodes further comprises one holder, comprising a plurality of supporting faces and the corresponding connector, comprising one holder mating bore, and a first end of the holder and a second end, the holder and the bars are located on the supporting faces of the holder, and are in contact with and enclose the proximal portion of a plurality of bars for stabilizing the first end and transferring the load of the framework components to the bars as well as to the connector.

15 Claims, 8 Drawing Sheets

(56) References Cited

U.S. PATENT DOCUMENTS

Figure 1A:
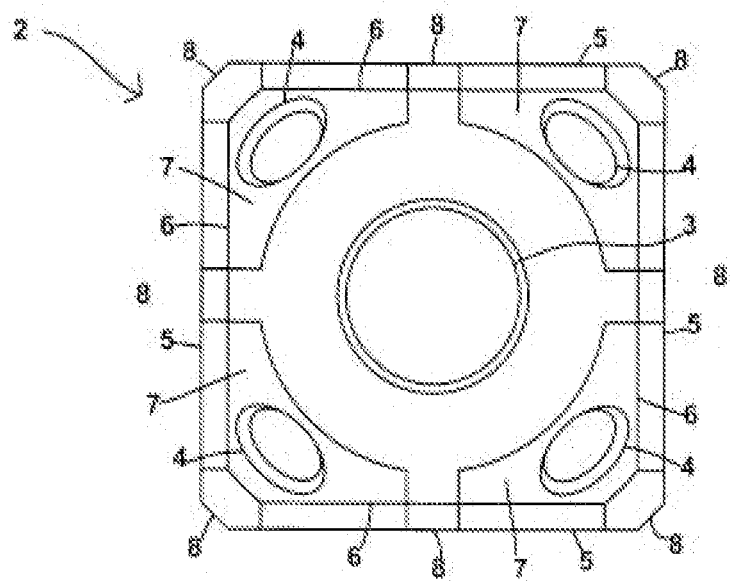

| | | |
|---|---|---|
| 3,632,147 A | 1/1972 | Finger |
| 5,030,103 A * | 7/1991 | Buist .................... G09B 23/26 434/278 |
| 5,095,677 A * | 3/1992 | Godbout ............ A47B 47/0008 403/176 |
| 6,792,732 B2 * | 9/2004 | Strassle .............. A47B 47/0016 403/171 |
| 2008/0175655 A1 | 7/2008 | Daubner |

* cited by examiner

SUPPORTING FRAMEWORK NODE

1. TECHNICAL FIELD

This invention relates to a supporting framework system, having connection nodes, the connection nodes having connectors, bars, and framework components, including panels and diagonal braces.

2. BACKGROUND ART

That type of framework systems have been known for a long time, and used both in temporary and contemporary structures. The connectors connect bars to each other, producing connection nodes. Various framework components, including panels and diagonal braces, can be placed in the framework system. Panels are flat elements, used mainly for separation purposes and diagonal braces comprise elongated elements in the form of a rod, wire or a profile element, used for improving the load bearing capacity of the framework system, bearing compression or tension forces or both.

In those framework systems, especially in temporary structures, like fair stands or booths, the connectors are the preferred elements in the framework system that the framework components are connected to, because the connectors are preferably manufactured from a durable material like stainless steel, that can withstand the load and weariness due to the numerous connection/disconnection routines, while the bars are preferred to be manufactured from lightweight materials, like aluminum. Therefore, the connectors are shaped not only to receive bars but also to be able to receive those framework components.

The connector's capacity of bearing the dead-lift of the framework components or the load transferred by them, especially the load transferred by the diagonal braces, affects the load bearing capacity of the overall system. Producing connectors with shapes that are enlarged, with regard to the shapes that they would have, if they didn't receive framework components together with the bars, can make the connectors considered as oversized for the cases in those framework systems without that components. Because the connectors are used numerously in those framework systems, the excess weight of an oversized connector has a limiting effect on the load bearing capacity of the overall system. The connector's capacity of attaching bars and framework components should be considered with regard to the connector's size. In known framework systems, the connector's capacity of attaching the bars and the framework components is limited, with regard to the connector's size.

Therefore, the object of my invention is to produce a connection node, in a supporting framework system, having a connector with an improved capacity, with regard to its size, of attaching the bars and the framework components.

3. DISCLOSURE OF THE INVENTION

For the purpose I stated above and in accordance with the invention, I suggest a supporting framework, having nodes and at least one framework component. The framework components are either panels or diagonal braces or a combination of them. At least one of the nodes has a connector and at least one bar. Each of the connectors has mating bores and each of the bars has a first end inserted into the mating bore of the connector of a first node and a second end, inserted into the mating bore of the connector of another node. The supporting framework is characterized in that; at least one of the nodes, further has a holder, having supporting faces, the corresponding connector, further has at least one holder mating bore and a first end of the holder is inserted into one of the holder mating bore and a second end, extends outward the connector and connected to at least one of the framework components, the holder and the bars are located, in relation to each other, such that, the supporting faces of the holder, are in contact with and substantially enclose the proximal portion of a plurality of bars, in a manner, stabilizing the first end of the holder and transferring the load of the framework components to the bars, as well as, to the connector, whereby a supporting framework is produced, wherein, the load of the framework components that is transferred to the node, is not taken and the stabilization of the components is not enabled, by the connector directly, but, shared between the connector and the surface of the bars. That collaboration increases the node's capacity of bearing the component load, with regard to the size of the connector.

Preferably, a plurality of portions of the surface of at least one connector, protuberate outward, each forming a face at the distal end of the protuberance. The faces are located in a corresponding plurality of faces of an imaginary polyhedron and the bars can be connected to the faces. A plurality of protuberances defines a plurality of depressions on the surface of the connector. At least one of the holder mating bores is on one of the depressions and the first end of the holder, shaped in relation with the corresponding depression, located in a manner being stabilized thereon, whereby the stabilization of the first end of the holder is also enabled substantially, also for the cases when at least one of the bars, that would be contacting the holder, is lacking.

Preferably, each of the protuberances have projections, formed with and projecting from the side surface of each protuberance, arranged substantially parallel to the corresponding face, toward the midpoint of corresponding edge of the imaginary polyhedron. Adjacent projections of the respective adjacent protuberances are aligned and project toward one another and connected to each other, arranged to define a plurality of depressions on the surface of the connector, together with the protuberances. The first end of the holder, shaped in relation with the corresponding depression, is located in a manner being stabilized thereon, whereby the stabilization of the first end of the holder, on the corresponding depression, is improved.

4. BRIEF DESCRIPTION OF DRAWINGS

Figure 1B:
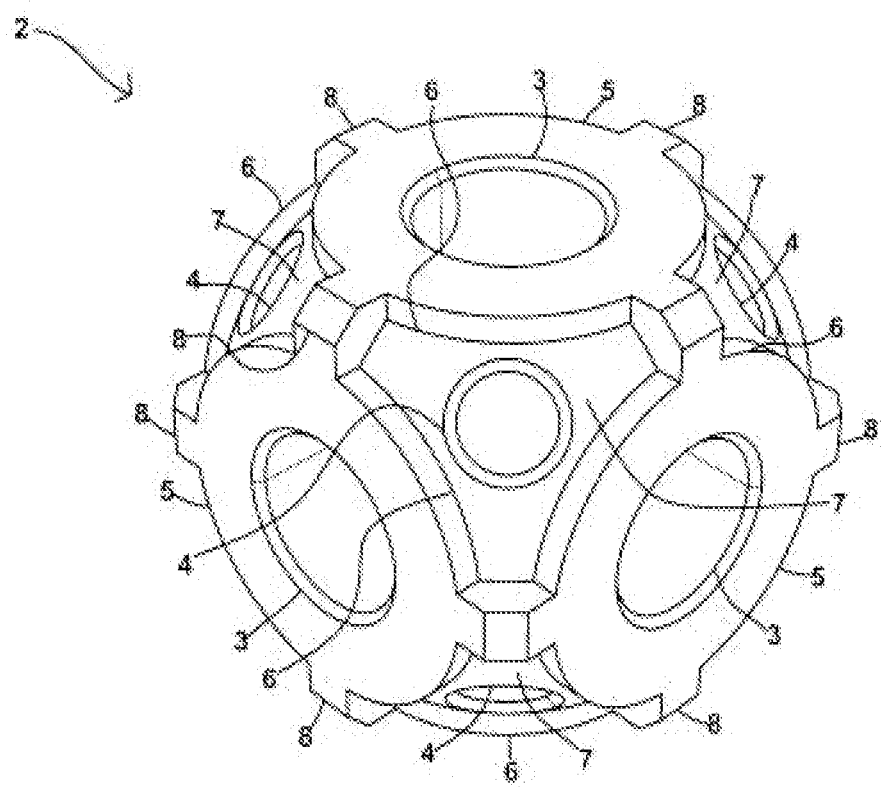
Figure 2:
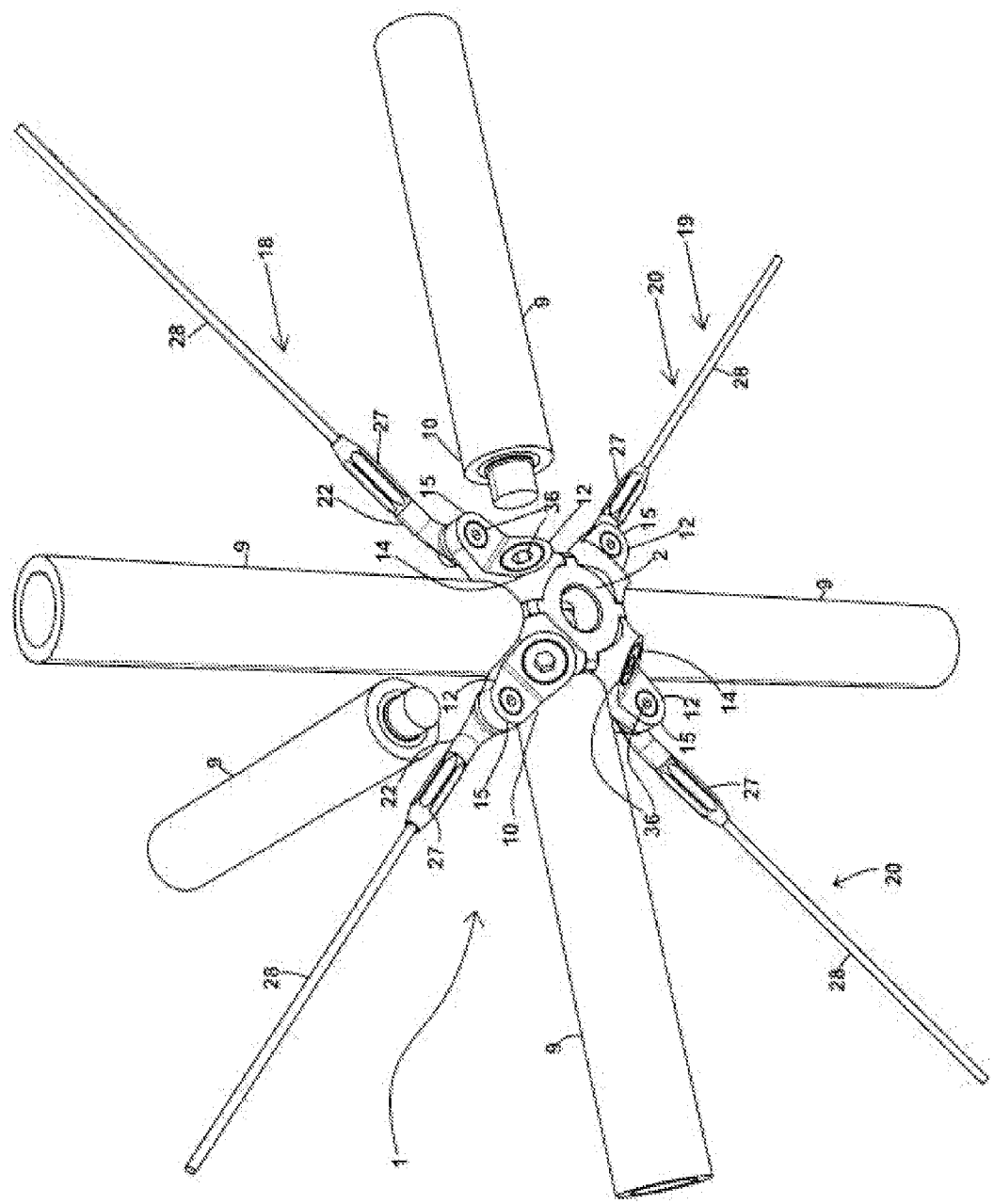
Figure 3:
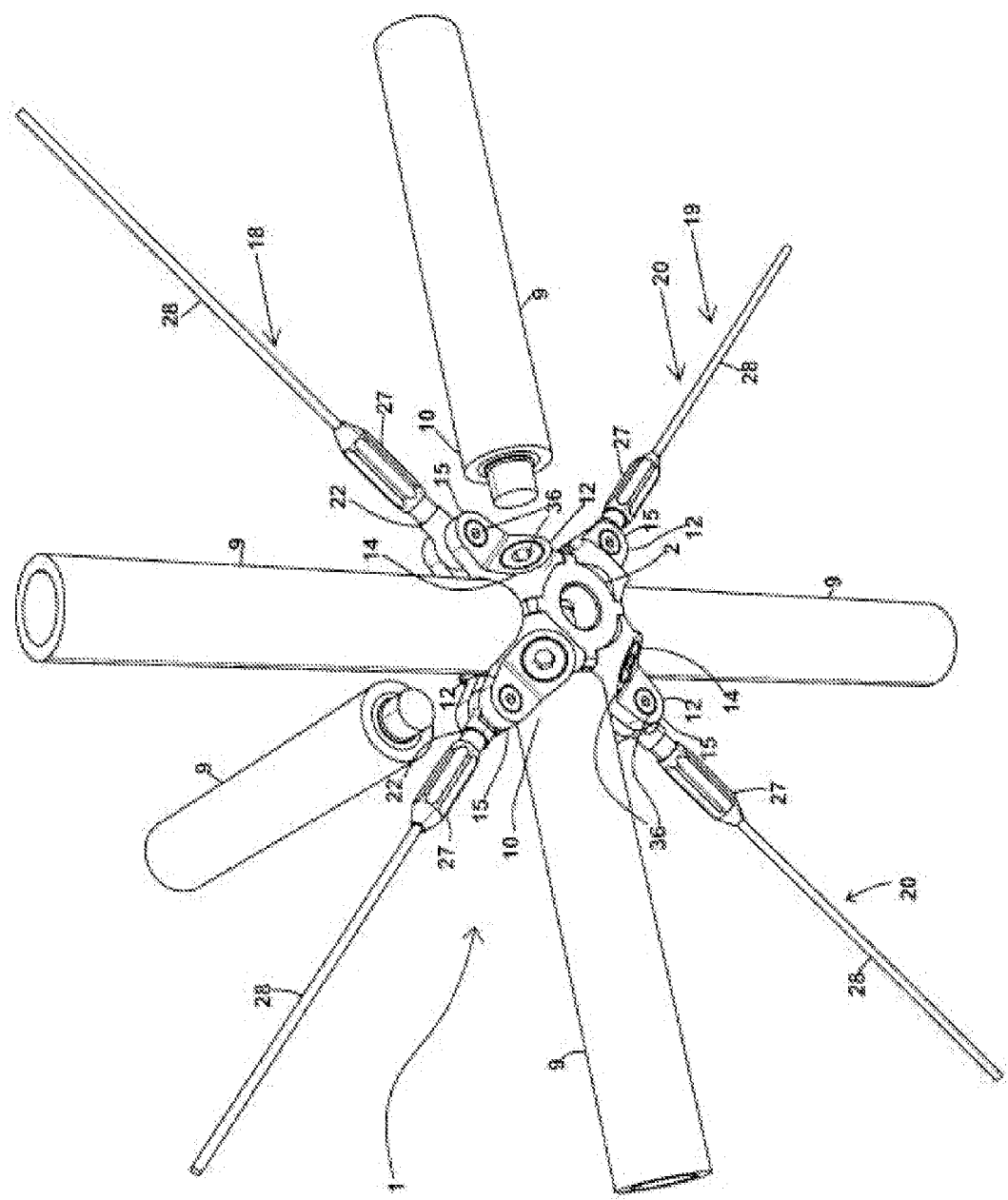
Figure 4:
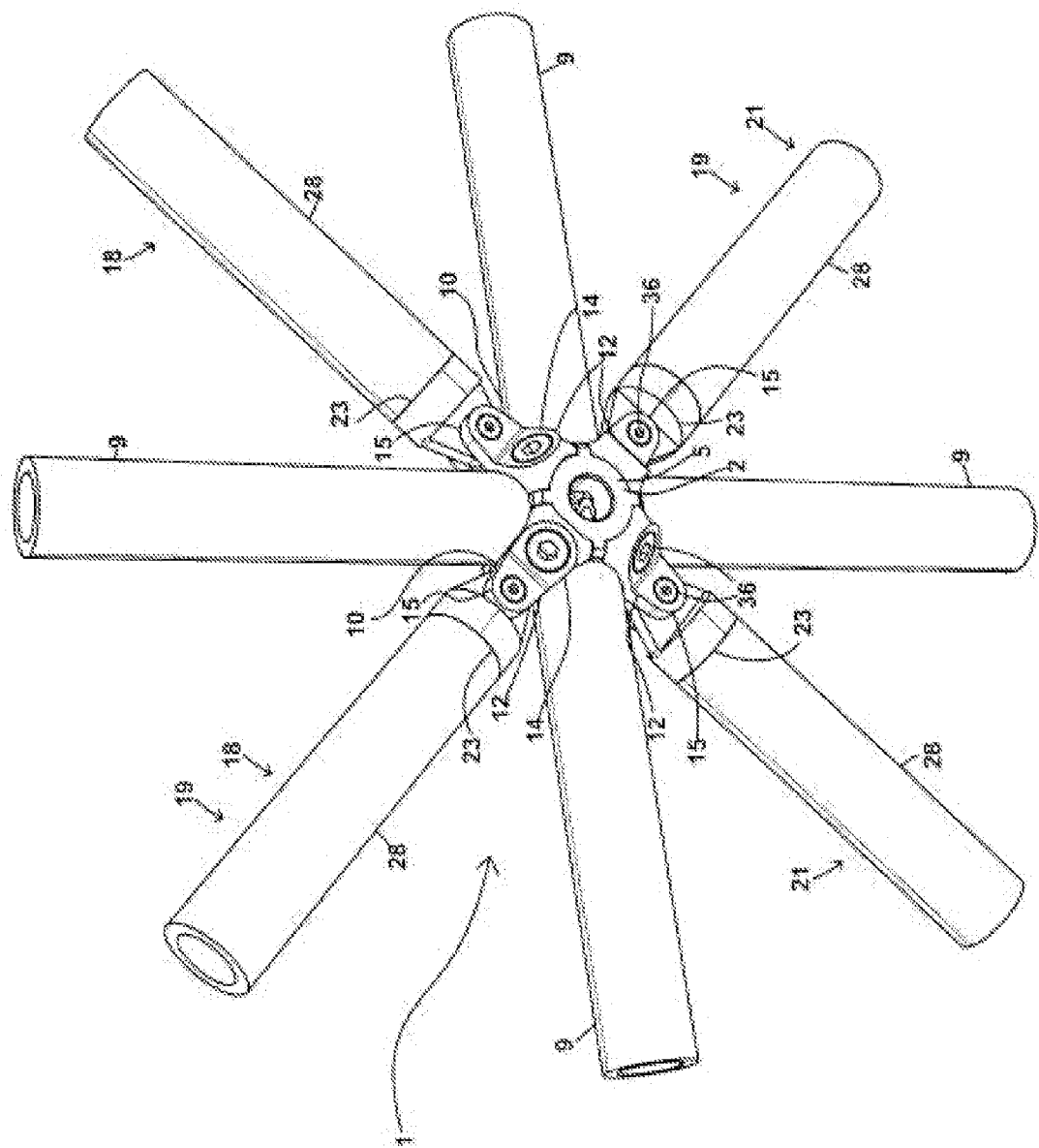
Figure 5A:
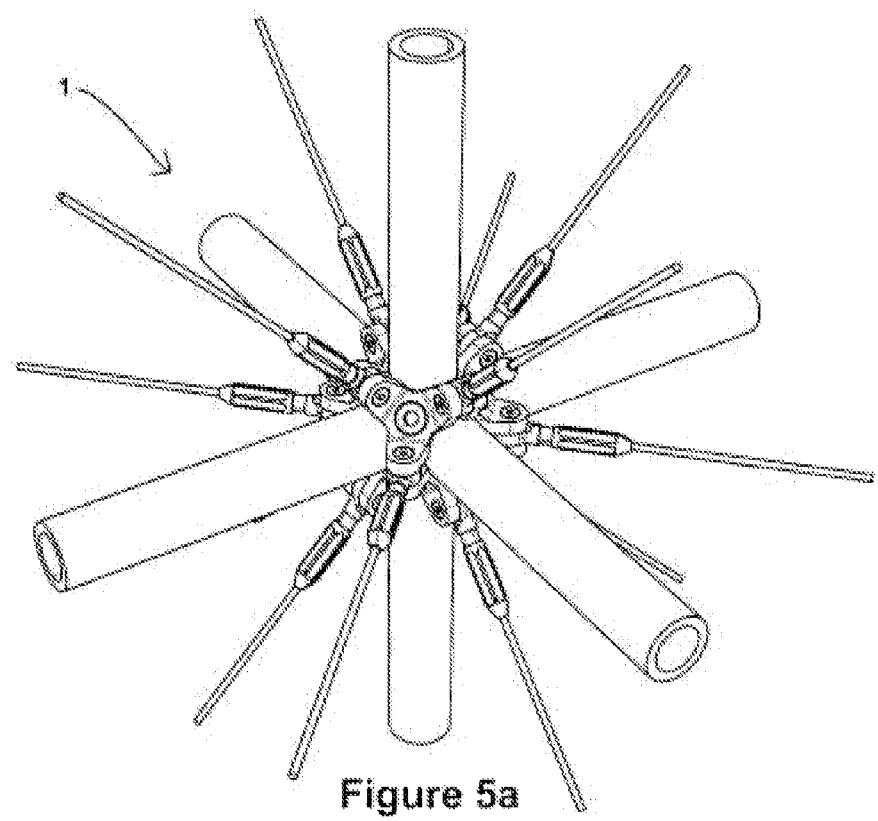
Figure 5B:
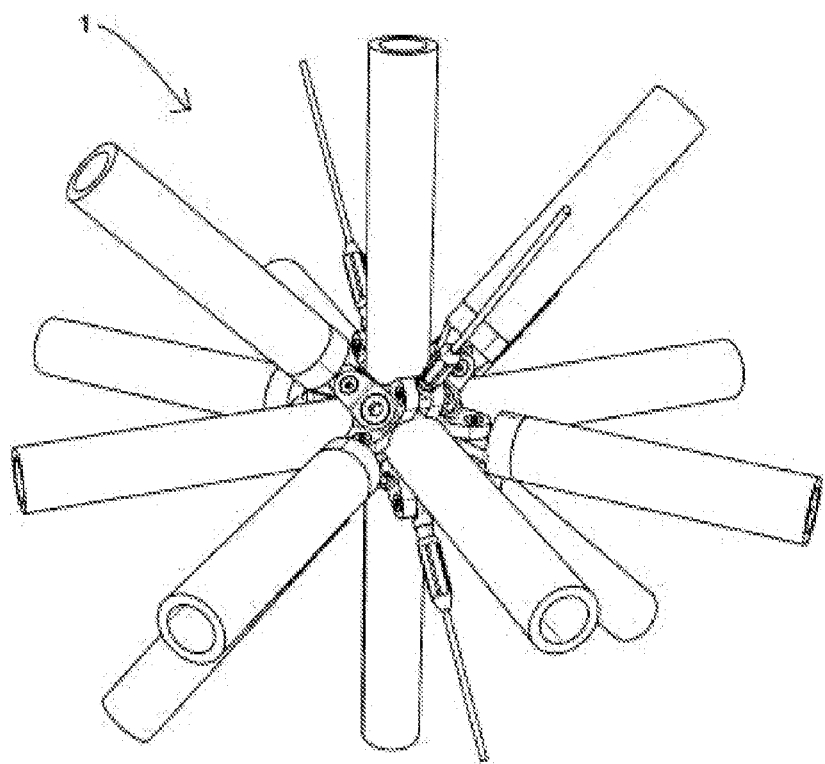
Figure 6:
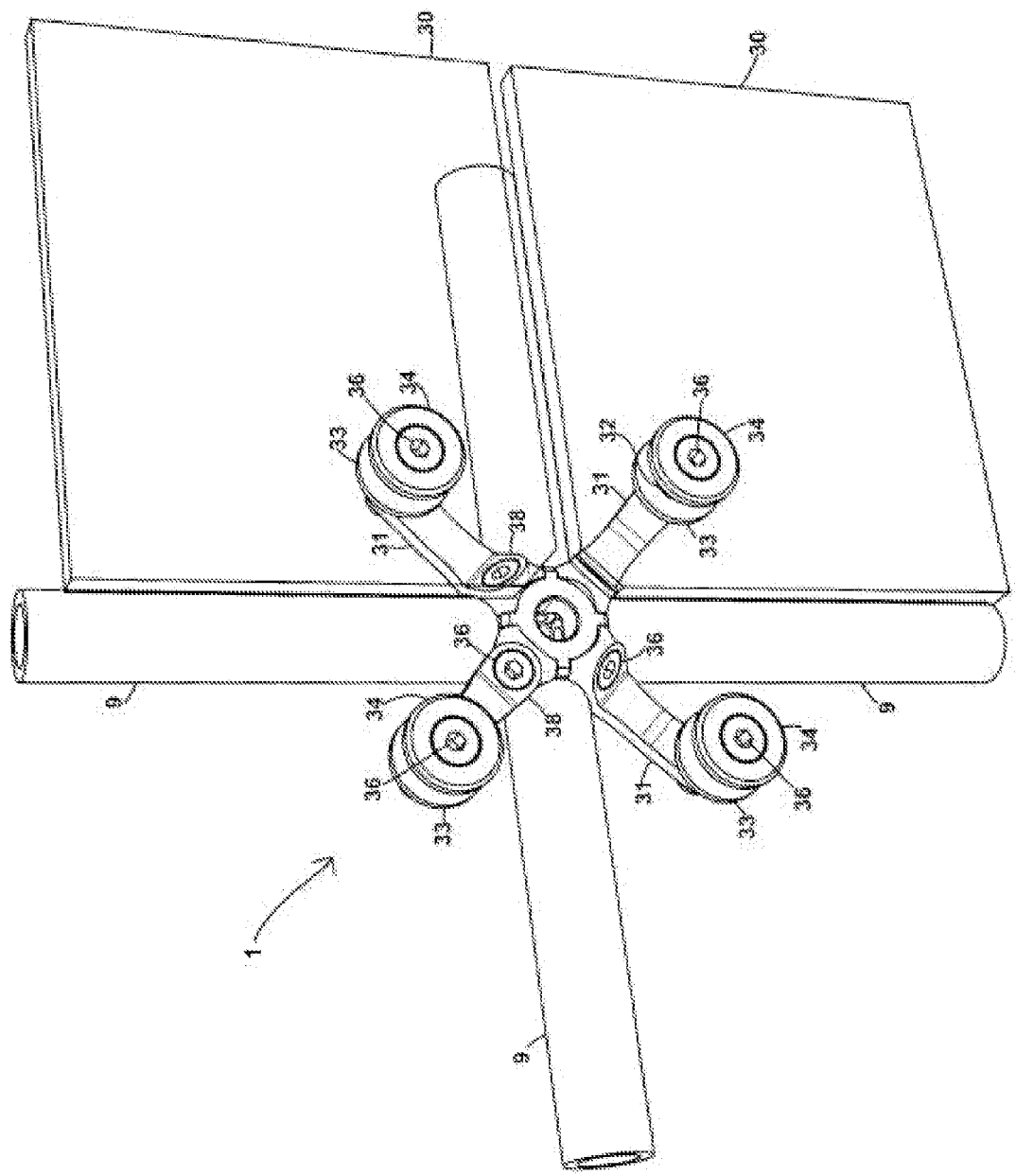
Figures 7A, 7B:
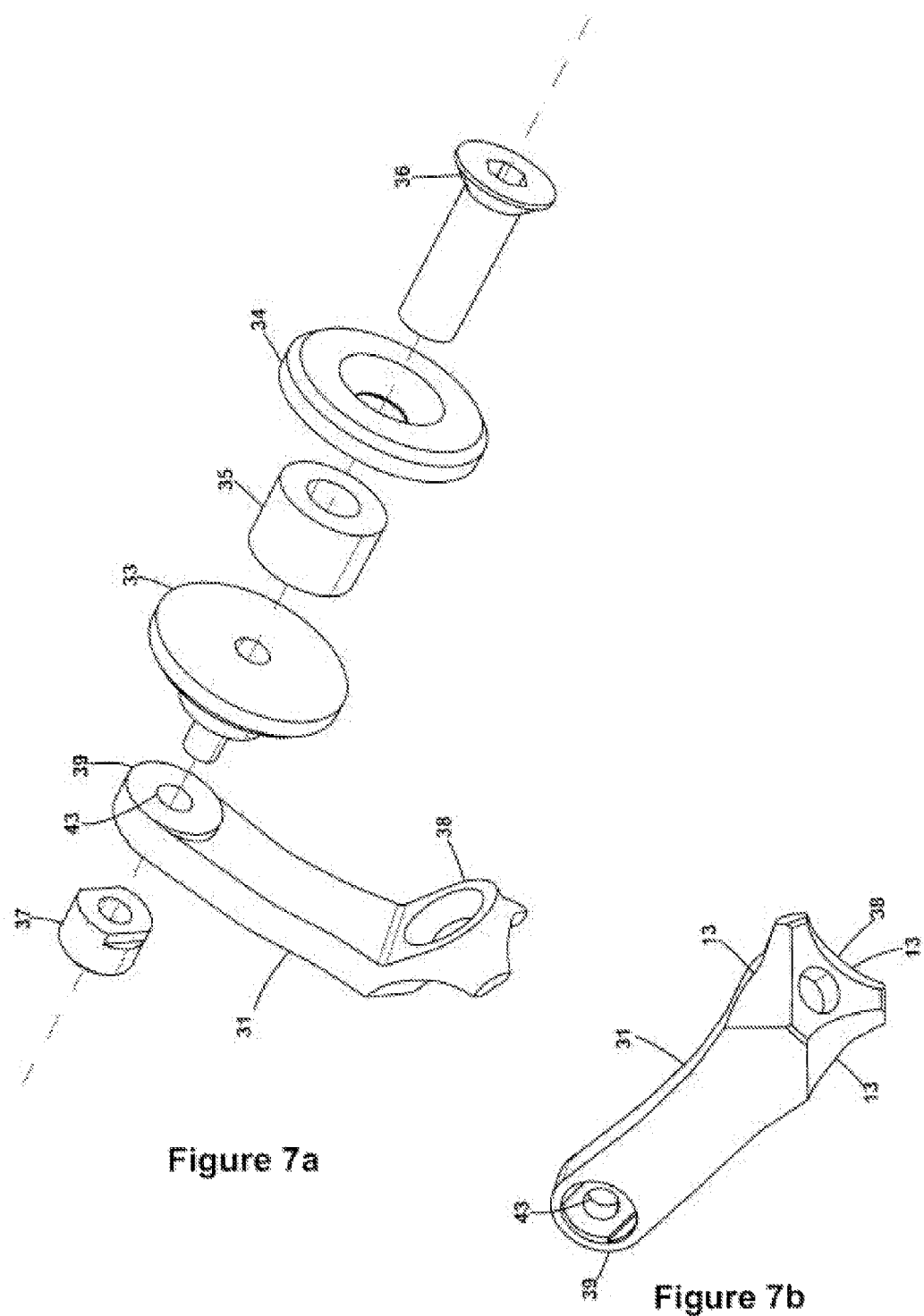
Figure 8A:
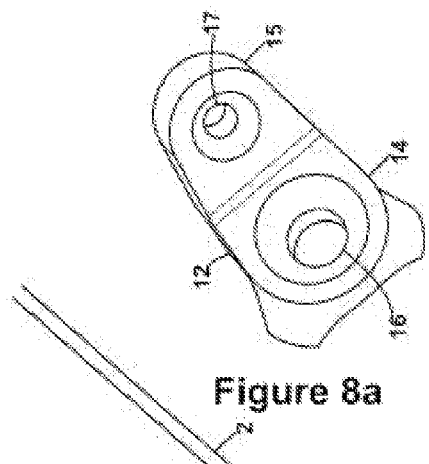
Figure 8B:
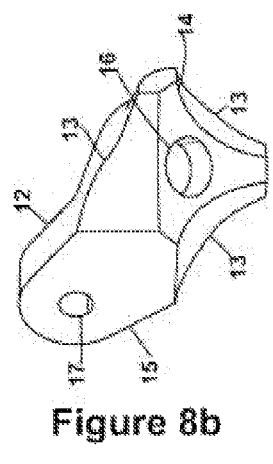
Figure 8C:
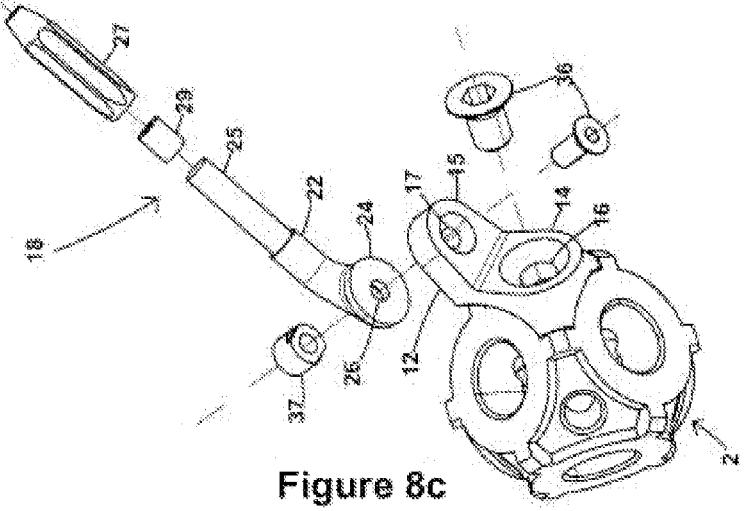
Figure 8D:
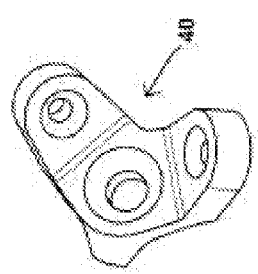
Figure 8E:
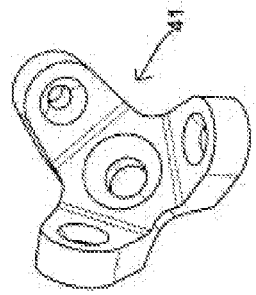

FIG. 1a shows the side elevation of the connector and FIG. 1b shows the perspective view of the connector, FIG. 2 shows a node with diagonal tension braces and holders, FIG. 3 shows a node with diagonal tension braces, each placed in between a couple of holders, FIG. 4 shows a node with diagonal compression braces, FIG. 5a shows a node with holders, each connected to a plurality of diagonal tension braces and FIG. 5b shows a node with holders each connected to a plurality of diagonal tension and compression braces, FIG. 6 shows a node with holders, each connected to a panel, FIG. 7a shows an exploded perspective view of a holder, that is used to be connected to a panel and FIG. 7b shows a back view of that holder, FIG. 8a shows a perspective view of a holder, FIG. 8b shows a back view of that holder, FIG. 8c shows an exploded view of the diagonal tension brace, connected to a holder, and the holder connected to a connector, FIG. 8d shows a two way holder and FIG. 8e shows a three way holder.

5. BEST MODES FOR CARRYING OUT THE INVENTION

The framework I suggest has nodes 1 and framework components 18 as shown in FIG. 2. The framework components 18 are either panels 30 as shown in FIG. 7a or diagonal braces 19 as shown in FIG. 2 or a combination of them. Each of the nodes 1 also have a connector 2 connected to bars 9, as shown in FIG. 2. FIG. 1a shows the side elevation of the connector 2 and FIG. 1b shows the perspective view of the connector 2. As shown in FIGS. 1a and 1b, each of the connectors 2 has mating bores 3 and each of the bars 9 has a first end inserted into the mating bore 3 of the connector 2 of a first node 1 and a second end, inserted into the mating bore 3 of the connector 2 of another node 1. The nodes 1 further have holders A 12 as shown in all of the figures except FIGS. 1a and 1b. Those holders A 12 have supporting faces 13. The connectors 2 further have holder mating bores 4 as shown in FIGS. 1a and 1b. The holders A 12 are shaped such that, when located properly, the first ends 14 of the holders A 12 are inserted into a holder mating bore 4 and the second ends 15, extend outward the connector 2 and connected to at least one of the framework components 18. The holder A 12 and the bars 9 are located, in relation to each other, such that, the supporting faces 13 of the holder A 12, are in contact with and substantially enclose the proximal portion 10 of a plurality of bars 9, in a manner, stabilizing the first end 14 and transferring the load of the framework components 18 to the bars 9 as well as to the connector 2, whereby a supporting framework is produced, wherein, the load of the framework components 18 that is transferred to the node 1, is not taken and the stabilization of the components is not enabled, by the connector 2 directly, but, shared between the connector 2 and the surface of the bars 9. That collaboration increases the node's 1 capacity of bearing the component load with regard to the size of the connector 2.

As shown in FIGS. 1a and 1b, preferably, a plurality of portions of the surface of at least one connector 2, protuberate outward, each forming a face 5 at the distal end of the protuberance 6. Those faces 5 are located in a corresponding plurality of faces of an imaginary polyhedron. The imaginary polyhedron is preferably a cube as shown in figures, but it can be another polyhedron, having faces, other than six, in number. Preferably the faces 5 are circular and the bars 9 are cylindrical, but the faces 5 can be shaped other than circular and preferably, in relation with the cross section of the corresponding bars 9. The bars 9 are connected to that faces 5. A plurality of protuberances 6 defines a plurality of depressions 7 on the surface of the connector 2.

The holder mating bore 4 corresponding to one of the holders A 12, is placed on one of the depressions 7. The first end 14 of the holder A 12, is shaped in relation with the corresponding depression 7, located and stabilized on that depression 7, whereby the stabilization of the first end 14 of the holder A 12 is also enabled substantially, also for the cases when at least one of the bars 9, that would be contacting the holder A 12, is lacking. As shown in FIGS. 2, 3, 4, 5a, 5b and 6 there are cases when some of the bars 9, that would be contacting the holder A 12, is lacking.

As shown in FIGS. 1a and 1b, preferably, each of the protuberances 6 have projections 8, formed with and projecting from the side surface of each protuberance 6, arranged substantially parallel to the corresponding face 5, toward the midpoint of corresponding edge of the imaginary polyhedron. Adjacent projections 8 of the respective adjacent protuberances 6 are aligned and project toward one another and connected to each other, arranged to define a plurality of depressions 7 on the surface of the connector 2, together with the protuberances 6. The first end 14 of the holder A 12, shaped in relation with the corresponding depression 7, is located and stabilized thereon, whereby the stabilization of the first end 14 of the holder A 12, on the corresponding depression 7, is improved.

As shown in FIG. 2, the diagonal braces 19 are basically connected to the second end 15 of one holder A 12. This is a preferred embodiment, because of its practicality. But, the diagonal braces 19 can be connected to a plurality of holders A 12. As shown in FIG. 3, for reasons of improving the loadability, the diagonal tension brace 20, is preferably located in between a couple of adjacent holders A 12 and connected to the second ends 15 of them. That embodiment doubles the loading capacity of the diagonal tension brace 20 without the holder A 12, being ruptured. As shown in FIG. 4, the holders A 12 can receive diagonal compression braces 21. The holders A 12 are basically shaped to receive one framework component 18 but, they can be in the form of a two way holder 40, receiving two of those framework components 18 and three way holder 41, receiving three of that framework components 18, as shown in the FIGS. 5a and 5b. The diagonal tension braces 20 and the diagonal compression braces 21 can be connected to the same connector 2 as shown in FIG. 5b.

As shown in FIG. 6, in a preferable embodiment, the second end 39 of the holder B 31 extends as an arm and is connected to a panel 30. The panel 30 preferably has a panel eye 32 at the point of connection. As shown in the FIG. 6 the first end 38 of the holder B 31 is connected to the connector 2, preferably, by means of a bolt 36 and as shown in the FIG. 7a, the holder B 31 has an eye C 42 on the second end 39. A first disc element 33 and a second disc element 34 is placed, one on the front and one on the back surface of the panel 30, aligned with the panel eye 32 and eye C 42 and secured to the second end 39 of the holder B 31 with a bolt 36 and a nut 37. A pipe 35 can be used to prevent the bolt 36 from damaging the edge of the panels 30, especially if the panel 30 is made of glass.

As shown in FIG. 8a, the holder A 12 has an eye A 16 at the first end 14 and an eye B 17 at the second end 15. The diagonal tension brace 20 has an elongated member 28, a connection element A 22 and an adjuster 27, at each end of the elongated member 28. The elongated member 28 can be in the form of a rod or a wire. The connection element A 22 preferably has a brace eye 26 at the first end 24 and screw threads at the second end 25. The adjuster 27 is in the form of a pipe and has screw threads inside. An end of the elongated member 28 is inserted into the adjuster 27, connected to a tab 29. The tab 29 prevents the corresponding end of the elongated member 28 from disconnecting the adjuster 27 and the end of the elongated member 28 is retained in the adjuster 27 when pulled. With one end of the elongated member 28 retained in, the adjuster 27 is screwed to the second 25 end of the connection element A 22. The brace eye 26 of the connection element A 22 is aligned to the eye B 17 of the holder A 12 and the connection element A 22 is connected pivotally, to the second end 15 of the holder A 12, preferably by means of a bolt 36 and a nut 37. The holder A 12 also is connected to the connector 2, preferably, by means of a bolt 36. The adjuster 27, not only connects the elongated member 28 to the connection element A 22, but, being rotated, adjusts the distance between two ends of the elongated member 28 and prevents the elongated member 28 from loosening, by applying tension on the elongated member 28. In the case of the diagonal compression braces 21, connection element B 23 is used to connect the elongated member 28 to the holder A 12, as shown in the FIG. 4.

6. INDUSTRIAL APPLICABILITY

All of the connectors and the holders can be produced with high quality stainless steel casting. The diagonal braces can be produced with conventional machining process. The bars can be made of extruded aluminum.

I claim:

1. A supporting framework, comprising:
a plurality of nodes;
at least one framework component;
wherein the framework component is selected from a group, consisting of at least one diagonal brace, at least one panel and combinations thereof; wherein at least one of the nodes comprises at least one connector and at least one bar; wherein each of the connectors comprises a plurality of mating bores; and wherein each of the bars has a first end and a second end, wherein the first end is inserted into one of the mating bores of the connector of a first node, wherein the second end is inserted into one of the mating bores of the connector of another node; wherein at least one of the nodes further comprises at least one holder having a plurality of supporting faces, and the corresponding connector further comprises at least one holder mating bore, and a first end of the holder is inserted into one of the holder mating bores and a second end thereof, extends outward the connector and connected to at least one of the framework components, wherein the supporting faces of the holder are in contact with the proximal portion of the bars located on the supporting faces of the holder and enclose the proximal portion of the bars for stabilizing the first end of the bars and transferring the load of the framework components to the bars as well as to the connector; wherein a plurality of portions on the surface of at least one of the connectors protuberate outward and distal end of each outwardly protuberating portions forms a face, wherein the faces are located in a corresponding plurality of faces of an imaginary polyhedron, wherein the bars can be connected to the faces and a plurality of protuberances defines a plurality of depressions on the surface of the connector wherein at least one of the holder mating bores is on one of the depressions and wherein the first end of the holder is shaped in relation with the corresponding depression and located for being stabilized on the corresponding depression.

2. The supporting framework in accordance with claim 1, wherein each of the protuberances comprises a plurality of projections, wherein the projections are formed with the side surface of each protuberances and project from the side surface of each protuberances, wherein each projection is arranged substantially parallel to the corresponding face, toward the midpoint of corresponding edge of the imaginary polyhedron; wherein adjacent projections of the respective adjacent protuberances are aligned and project toward one another and connected to each other, wherein adjacent projections of the respective adjacent protuberances are arranged to define a plurality of depressions on the surface of the connector and together with the protuberances, wherein the first end of the holder is shaped in relation with the corresponding depression, wherein the first end of the holder is located on the corresponding depression for being stabilized.

3. The supporting framework in accordance with claim 1, wherein at least one of the framework components is located in between a couple of adjacent holders and connected to the second ends of the adjacent holders.

4. The supporting framework in accordance with claim 1, wherein at least one of the framework components is a diagonal brace having an elongated member and a connection element at each end of the elongated member, wherein the connection element of a first end is connected pivotally to the second end of the holder of a first connector and wherein the connection element of a second end is connected pivotally to the second end of the holder of another connector for producing a diagonal connection.

5. The supporting framework in accordance with claim 4, wherein at least one of the elongated elements of at least one diagonal brace is a wire.

6. The supporting framework in accordance with claim 4, wherein at least one of the elongated elements of at least one diagonal brace is a rod.

7. The supporting framework in accordance with claim 1, wherein the imaginary polyhedron is a cube.

8. The supporting framework in accordance with claim 1, wherein at least one of the bars is cylindrical.

9. The supporting framework in accordance with claim 1, wherein at least one of the framework components is located in between a couple of adjacent holders and connected to the second ends thereof.

10. The supporting framework in accordance with claim 2, wherein at least one of the framework components is located in between a couple of adjacent holders and connected to the second ends thereof.

11. The supporting framework in accordance with claim 1, wherein at least one of the framework components is a diagonal brace, wherein the diagonal brace comprises an elongated member and a connection element at each end of the elongated member, wherein the connection element of a first end is connected pivotally to the second end of the holder of a first connector and wherein the connection element of a second end is connected pivotally to the second end of the holder of another connector for producing a diagonal connection.

12. The supporting framework in accordance with claim 2, wherein at least one of the framework components is a diagonal brace, wherein the diagonal brace comprises an elongated member and a connection element at each end of the elongated member, wherein the connection element of a first end is connected pivotally to the second end of the holder of a first connector and wherein the connection element of a second end is connected pivotally to the second end of the holder of another connector for producing a diagonal connection.

13. The supporting framework in accordance with claim 3, wherein at least one of the framework components is a diagonal brace, wherein the diagonal brace comprises an elongated member and a connection element at each end of the elongated member, wherein the connection element of a first end is connected pivotally to the second end of the holder of a first connector and wherein the connection element of a second end is connected pivotally to the second end of the holder of another connector for producing a diagonal connection.

14. The supporting framework in accordance with claim 9, wherein at least one of the framework components is a diagonal brace, wherein the diagonal brace comprises an elongated member and a connection element at each end of the elongated member, wherein the connection element of a first end is connected pivotally to the second end of the holder of a first connector and wherein the connection element of a second end is connected pivotally to the second end of the holder of another connector for producing a diagonal connection.

15. The supporting framework in accordance with claim 10, wherein at least one of the framework components is a diagonal brace, wherein the diagonal brace comprises an elongated member and a connection element at each end of the elongated member, wherein the connection element of a first end is connected pivotally to the second end of the holder of a first connector and wherein the connection element of a second end is connected pivotally to the second end of the holder of another connector for producing a diagonal connection.

* * * * *